(12) United States Patent
Belyaev

(10) Patent No.: US 8,503,985 B1
(45) Date of Patent: Aug. 6, 2013

(54) REAL-TIME REMOTE STORAGE

(75) Inventor: Alexander Belyaev, Seattle, WA (US)

(73) Assignee: DECHO Corporation, Pleasant Grove, UT (US)

( * ) Notice: Subject to any disclaimer, the term of this patent is extended or adjusted under 35 U.S.C. 154(b) by 0 days.

(21) Appl. No.: 13/168,224

(22) Filed: Jun. 24, 2011

(51) Int. Cl.
*H04W 24/00* (2009.01)
*G06F 15/16* (2006.01)

(52) U.S. Cl.
USPC .......................... 455/412; 455/456.1; 709/231

(58) Field of Classification Search
USPC ... 705/1, 204; 725/103; 709/231, 203; 707/5, 707/609; 455/456; 375/220
See application file for complete search history.

(56) References Cited

U.S. PATENT DOCUMENTS

| | | | |
|---|---|---|---|
| 2003/0061369 A1* | 3/2003 | Aksu et al. | 709/231 |
| 2003/0163339 A1* | 8/2003 | Elliot | 705/1 |
| 2006/0106539 A1* | 5/2006 | Choate et al. | 702/2 |
| 2009/0041100 A1* | 2/2009 | Kimmich et al. | 375/220 |
| 2009/0094652 A1 | 4/2009 | Al Adham et al. | |
| 2009/0164253 A1* | 6/2009 | Lyshkow | 705/3 |

* cited by examiner

*Primary Examiner* — Nizar Sivji
(74) *Attorney, Agent, or Firm* — BainwoodHuang

(57) ABSTRACT

An improved technique transmits data acquired with a smartphone to a remote storage server while the smartphone acquires additional data. For example, a user wishing to record a live scene with a smartphone camera establishes a connection with a remote storage server with which the user has an account. Once the connection is established and the user begins recording the live scene, the smartphone generates video data from images of the recorded live scene and places some predetermined amount of acquired video data into a data packet. The smartphone then sends the data packet to the remote storage server over the connection. As the data packet is being sent, the smartphone places another predetermined amount of acquired data. Because the predetermined amount of data is very small, the net amount of data stored is limited by the available space on the remote storage server rather than the local hard drive of the smartphone.

21 Claims, 6 Drawing Sheets

REAL-TIME REMOTE STORAGE

BACKGROUND

A conventional mobile phone enables a user to record live scenes using an embedded camera. Image processing hardware on such a conventional mobile phone acquires images of the live scenes and formats the images according to a compression scheme to create video data. The conventional mobile phone stores the video data in a video file on an internal storage device for later viewing.

After the user finishes recording the live scene and the image processing hardware completes writing video data to the video file, the user can upload the video file to a remote server. For example, the user uploads a video file to a YouTube™ (Google Inc., Mountain View, Calif.) server, from which the user can access the video file using an Internet browser.

Once the video file has been uploaded to a remote server, the user can delete the video file from the internal storage device.

SUMMARY

Unfortunately, the above described conventional mobile phone suffers deficiencies which stem from the fact that an internal storage device has limited storage space. Even with good compression algorithms, a video file storing video data representing even a moderate amount of recorded material can easily fill all available space in the internal storage device. Consequently, even if the user intends to store the video file on a remote server, the user is limited in the size of the video file to the current amount of unoccupied storage on the internal storage device. This constraint in video file size ultimately limits what the user can record with the conventional mobile phone.

In contrast to the conventional mobile phone which limits the ability of a user to acquire large amounts of video data, an improved technique transmits data acquired with a smartphone to a remote storage server while the smartphone acquires additional data. For example, a user wishing to record a live scene with a smartphone camera establishes a connection with a remote storage server with which the user has an account. Once the connection is established and the user begins recording the live scene, the smartphone generates video data from images of the recorded live scene and places some predetermined amount of acquired video data into a data packet. The smartphone then sends the data packet to the remote storage server over the connection. As the data packet is being sent, the smartphone places another predetermined amount of acquired data. Because the predetermined amount of data is very small (typically a few kilobytes), the net amount of data stored is limited by the available space on the remote storage server rather than the local hard drive of the smartphone.

One embodiment of the improved technique is directed to a computer-implemented method of storing data. The method includes establishing a connection between a smartphone and a storage device which is external to the smartphone. The method also includes acquiring, by the smartphone, a first portion of data from a data source which is external to the smartphone. The method further includes transmitting the first portion of the data to the storage device through the connection concurrently with an acquisition, by the smartphone, of a second portion of the data from the data source.

Additionally, some embodiments of the improved technique are directed to a system for storing data. The system includes a network interface coupled to a network, a memory and a processor coupled to the memory, the processor configured to carry the method of storing data.

Furthermore, some embodiments of the improved technique are directed to a computer program product having a non-transitory computer readable storage medium which stores code including a set of server instructions to carry the method of storing data.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2(*b*) is a schematic diagram of a remote storage server within the electronic environment illustrated in FIG. 1.

DETAILED DESCRIPTION

An improved technique transmits data acquired with a smartphone to a remote storage server while the smartphone acquires additional data. For example, a user wishing to record a live scene with a smartphone camera establishes a connection with a remote storage server with which the user has an account. Once the connection is established and the user begins recording the live scene, the smartphone generates video data from images of the recorded live scene and places some predetermined amount of acquired video data into a data packet. The smartphone then sends the data packet to the remote storage server over the connection. As the data packet is being sent, the smartphone places another predetermined amount of acquired data. Because the predetermined amount of data is very small (typically a few kilobytes), the net amount of data stored is limited by the available space on the remote storage server rather than the local hard drive of the smartphone.

Figure 1:
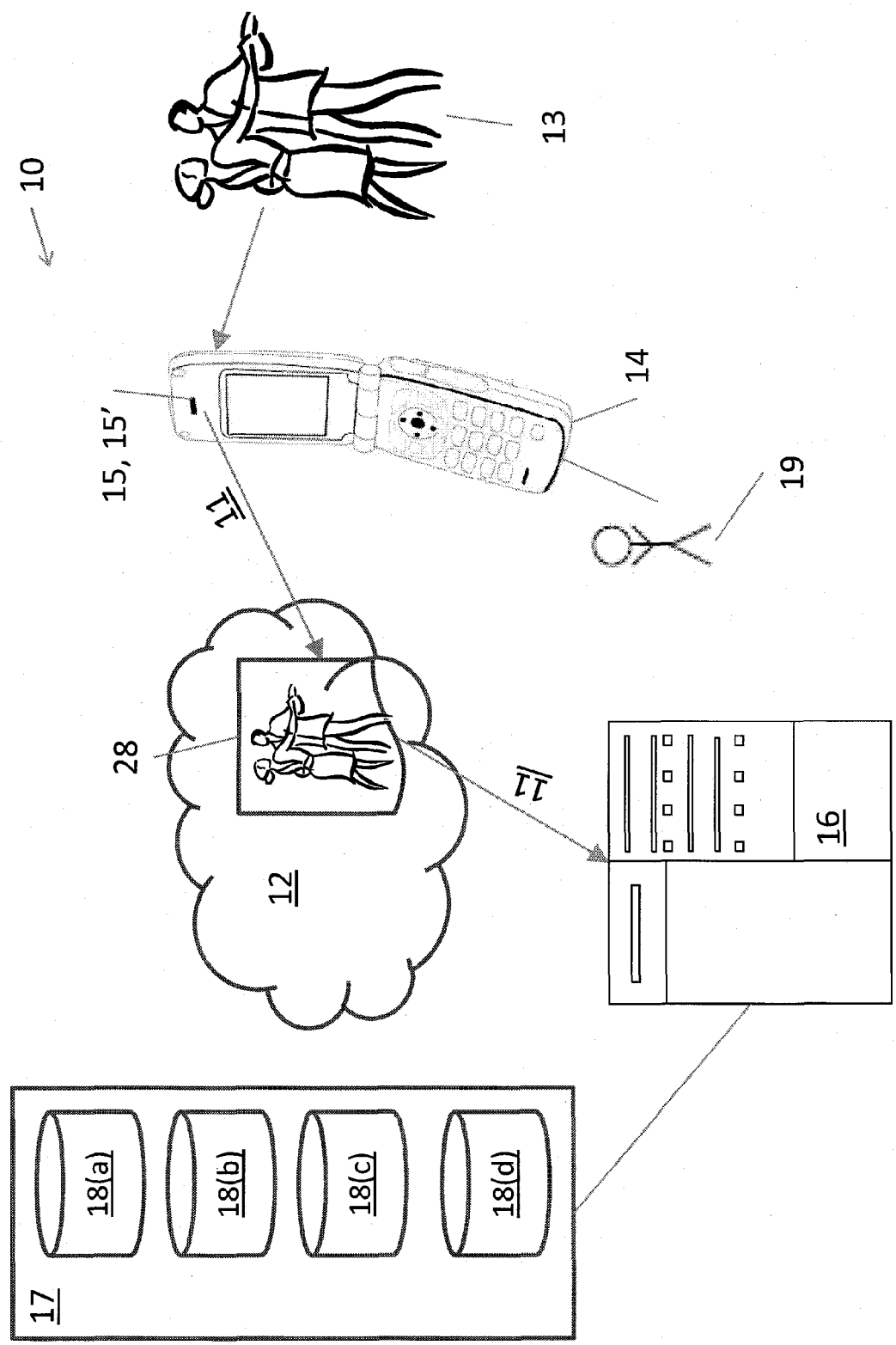
FIG. 1 is a schematic diagram illustrating an electronic environment for carrying out the improved technique.

FIG. 1 shows an electronic environment 10 which is suitable for use by the improved technique. Electronic environment 10 includes communications medium 12, smartphone 14 and storage server 16.

Communication medium 12 provides connections between smartphone 14 and a storage server 16. Communications medium 12 takes the form of a wireless signal conduit such as cellular signals, wireless Internet signals obeying an 802.11x standard, etc.

Smartphone 14 is constructed and arranged to acquire video data and send the video data to storage server 16 over connection 11 through communications medium 12. Smartphone 14 includes camera 15 for acquiring video data from live scene 13. In some arrangements, smartphone 14 further includes a Global Positioning System (GPS unit) 15'.

Storage server 16 is constructed and arranged to receive files from users over an established connection and store the received files. Storage server 16 includes a storage disk array 17 which contains storage disks 18(a), 18(b), 18(c) and 18(d), on which files received by storage server 16 over connection 11 are stored.

During operation, a user 19 runs an application on smartphone 14 which sends a request to establish a connection 11 to storage server 16. Once connection 11 is established, user 19 records live scene 13 using the smartphone camera 15 and, in recording live scene 13, generates video data within smartphone 14. Once smartphone 14 generates a predetermined amount of video data, smartphone 14 generates a data packet 28 which includes the predetermined amount of video data and sends the data packet 28 to storage server 16. While smartphone sends the data packet 28 to storage server 16, smartphone 14 continues to acquire video data via camera 15 and, when another predetermined amount of video data is acquired, generates another package to be sent to storage server 16. Storage server 16 then stores the received data packets 28 on disks 18(a), 18(b), 18(c) and 18(d) within storage disk array 17 as the data packets 28 are received.

Advantageously, the improved technique requires only as much memory within smartphone 14 as required to store the predetermined amount of video data, which could be as little as a few kilobytes of storage. Because the video data is transmitted to storage server 16 over connection 11 as smartphone 14 acquires the video data, the amount of video data acquired from live scene 13 is only limited by the amount of storage on storage disk array 17 available to user 19. That is, the amount of available memory within smartphone 14 does not limit the amount of video data smartphone 14 can acquire and store.

It should be understood that data packets 28 are arranged by smartphone 14 as data packets having a payload which houses the predetermined amount of video data and a header which contains information about the video data. Further description of such data packets will be made with regard to FIG. 3 below.

Additional detail of how smartphone 14 generates data packets 28 and how data packet 28 is received at storage server 16 will be explained in regard to FIGS. 2(a), 2(b), 3 and 4.

Figure 2A:
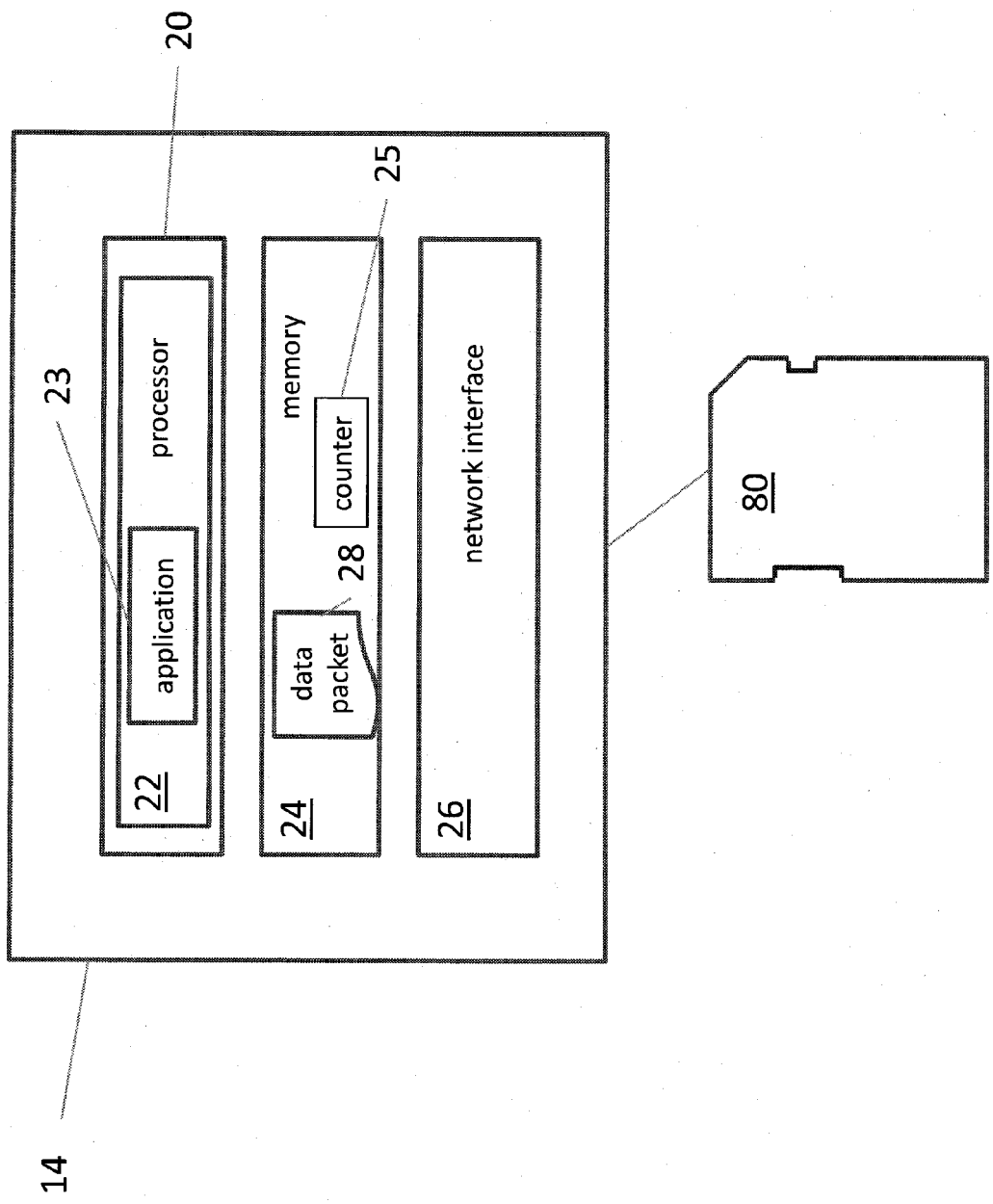
FIG. 2(*a*) is a schematic diagram of a smartphone within the electronic environment illustrated in FIG. 1.

FIG. 2(a) shows further detail of smartphone 14. Smartphone 14 includes a controller 20 which in turn includes processor 22. Smartphone 14 also includes memory 24 and network interface 26.

Memory 24 is configured to store a computer program 80 which is constructed and arranged to acquire video data via camera 15 (see FIG. 1) and send it for storage on storage server 16. Memory 24 is further configured to store a data packet 28 which contains the acquired video data and to store a counter 25 which identifies data packet 28. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 80 stored in memory 24.

Network interface 26 is constructed and arranged to send and receive data over communications medium 12. Specifically, network interface 26 is configured to establish connection 11 (see FIG. 1) with storage server 16.

Figure 2B:
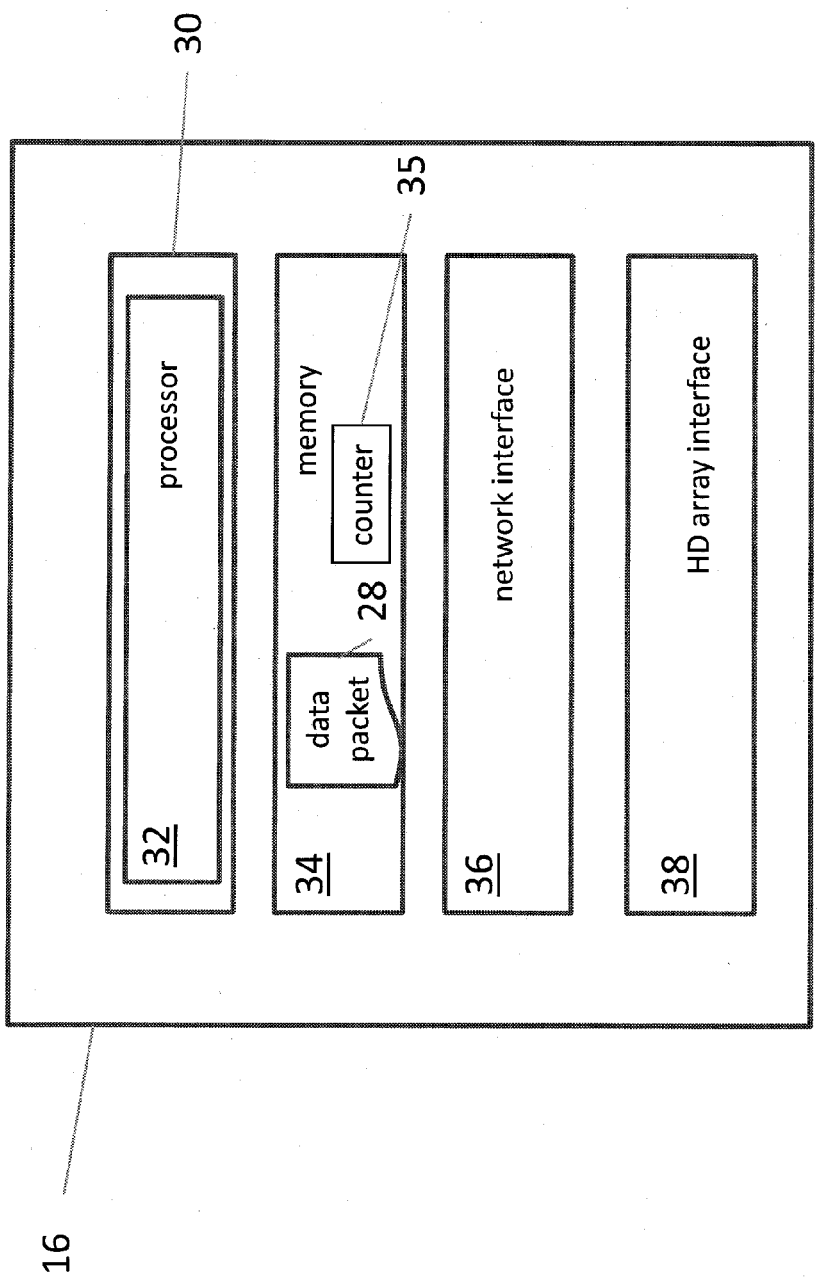

FIG. 2(b) shows further detail of storage server 16. Storage server 16 includes a controller 30 which in turn includes processor 32. Storage server 16 also includes memory 34, network interface 36 and hard drive (HD) interface 38.

Memory 34 is configured to receive data packets 28 over connection 11 (see FIG. 1). Memory 24 generally takes the form of, e.g., random access memory, flash memory or a non-volatile memory.

Processor 32 can take the form of, but is not limited to, an Intel or AMD-based MPU, and can be a single or multi-core running single or multiple threads. Processor 32 is coupled to memory 34 and is configured to read a header of data packet 28 stored in memory 24.

Network interface 36 is constructed and arranged to send and receive data over communications medium 12. Specifically, network interface 36 is configured to receive data packets 28 over connection 11.

HD interface 38 is constructed and arranged to send data received over connection 11 to disks within disk array 17.

During operation, user 19 runs an application 23 on processor 22 which establishes a connection 11, via network interface 26, to storage server 12. In some arrangements, in establishing connection 11, user 19 supplies credentials (e.g., username/password combination) to storage server 16. Once storage server 16 verifies credentials, connection 11 is established.

User 19 begins recording live scene 13 (see FIG. 1) and processor 22 generates video data from the recording. Processor 22 converts the video data from electrical signals captured from circuitry within camera 15 to binary data for storage in memory. Application 23 then creates a data packet 28 in response to a predetermined amount video data having been generated by the processor.

Figure 3:
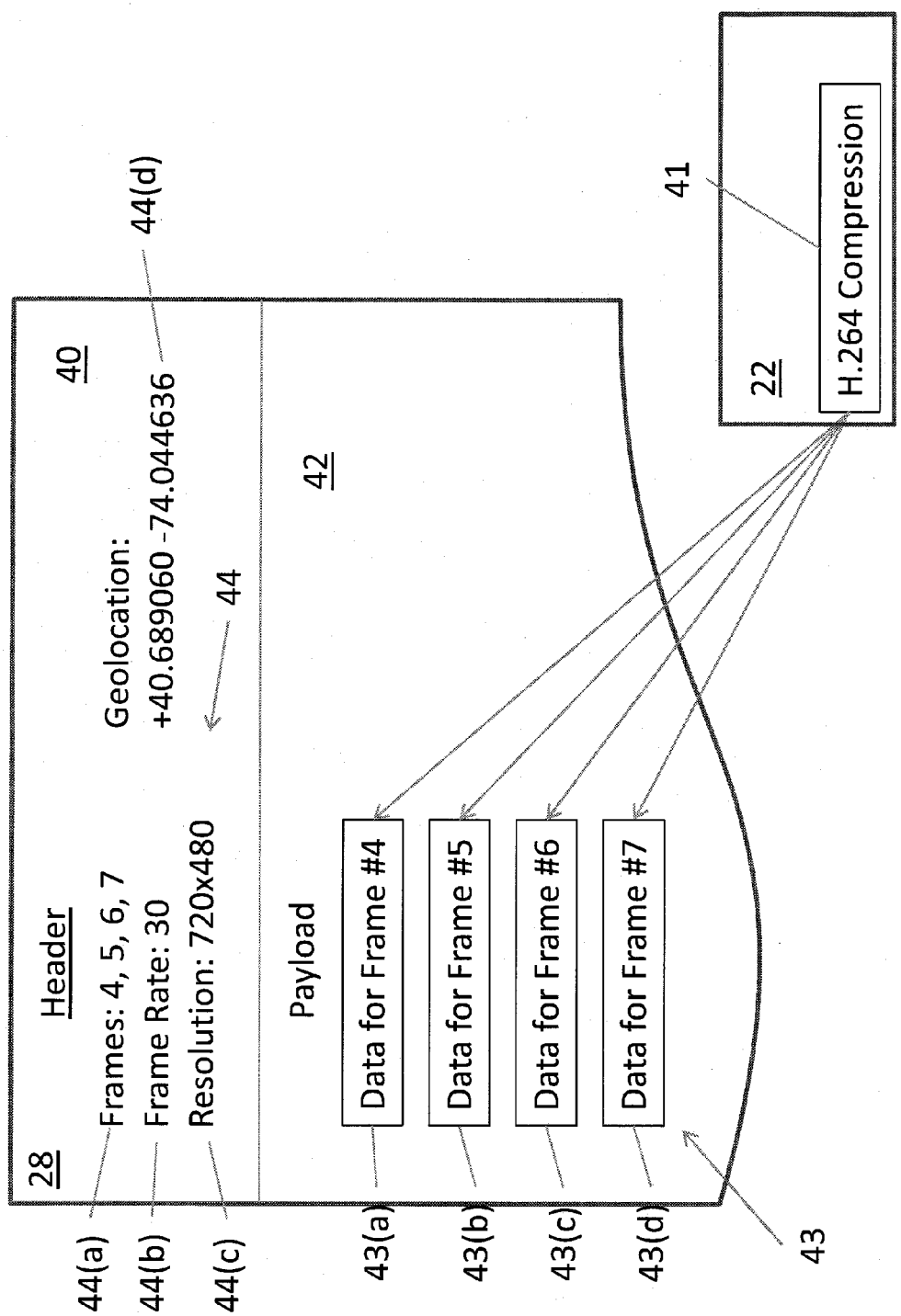
FIG. 3 is a schematic diagram of a data packet formed by an application running on the processor of the smartphone illustrated in FIG. 2(*a*).

FIG. 3 shows details of data packet 28. Data packet 28 includes a header 40 and payload 42.

Payload 40 of data packet 28 is constructed and arranged to store a predetermined amount video data. Video data is stored with reference to particular video frames, i.e. still pictures from live scene 13 (see FIG. 1) which, when shown at a certain frequency and in a particular order, recreate live scene 13 as recorded by smartphone 14. For example, four video frames 43(a), 43(b), 43(c) and 43(d) (video frames 43) are stored in payload 40.

Video frames 43 are arranged for storage in payload 40 in a particular format. In some arrangements, processor 22 formats video frames 43 using a H.264 compression standard 41 in order to limit the amount of space occupied by the video data, as well as to conform to industry standards obeyed by digital video players.

Header 42 of data packet 28 is constructed and arranged to provide identifying parameters 44 concerning video data stored in payload 40 to storage server 16. Header 42 includes parameters such as video resolution 44(c) and frame rate 44(b) which derive from settings in smartphone 14. Header 42 further contains frame identifiers 44(a) which identify the particular frames stored within payload 40. Processor 34 of storage server 16 uses frame identifiers 44(a) to assemble video frames 43 in the correct order over multiple data packets 28.

In some arrangements, header 42 further includes a geolocation parameter 44(d) which identifies a location in which the live scene 13 (see FIG. 1) was recorded. The location is determined with the GPS unit 15' on smartphone 14. Geolocation parameter 44(d) is shown in FIG. 3 as a pair of GPS coordinates represented as decimal numbers although geolocation parameter 44(d) is stored as a bit string.

Figure 4:
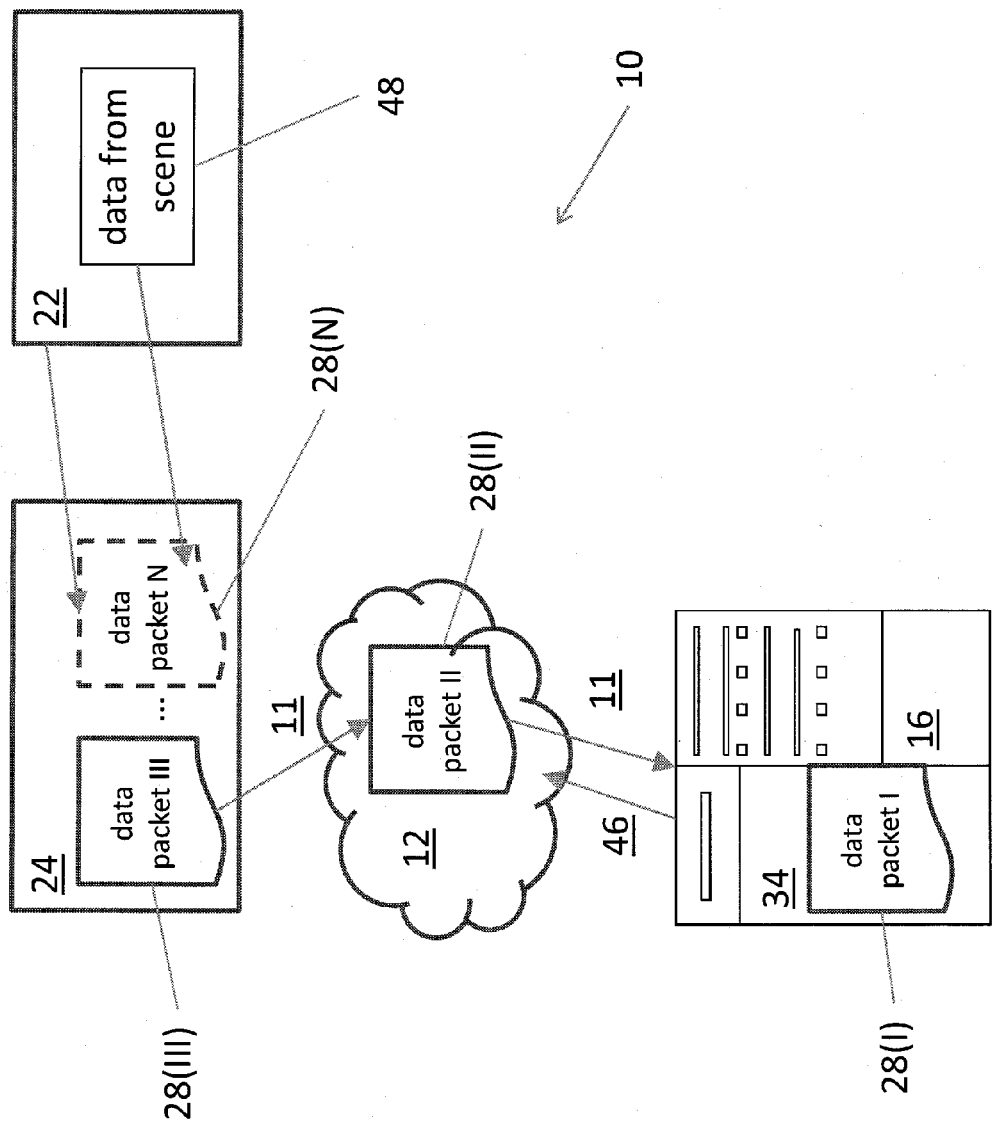
FIG. 4 is a schematic diagram of a system which stores recorded live scenes according to the improved technique within the electronic environment illustrated in FIG. 1.

Further description of the improved technique continues with regard to FIG. 4.

FIG. 4 shows further detail of the electronic environment 10 configured to carry out the improved technique. In FIG. 4, a chain of data packets 28(I), 28(II), 28(III) and 28 (IV) are shown in various locations within electronic environment 10 to illustrate how application 23 on processor 22 (see FIG. 2(a)) converts the recording of live scene 13 (see FIG. 1) into the chain of data packets 28(I), 28(II), 28(III) and 28 (IV).

Video data 48, having been converted to binary data by processor 22 as described above, is placed in payload of data packet 28(I). Processor 22 determines when video data 48 is of a predetermined size (e.g., 4 frames of 720×480 pixels at 30 frames per second). Processor 22 then processes the video data as described above (e.g., compression via an H.264 standard) and stores the resulting video frames in payload 42 of data packet 28(I) (see FIG. 3). Processor 22 also reads counter 25 stored in memory 24 (see FIG. 2(a)) which identifies the frame numbers of the video frames being stored in payload 42. Processor 22 then writes frame numbers corresponding to the counter index read from memory 24, as well as frame rate and resolution parameters to header 40 of data packet 28(I) as described above.

Once processor 22 completes the generation of data packet 28(I), processor 22 transmits data packet 28(I) to storage server 16 over connection 11 via network interface 36 (see FIG. 2(a)). Storage server sends data packet 28(I) to storage disk array 17 (see FIG. 1) via HD interface 38 (see FIG. 2(b)).

While processor 22 generates data packet 28(I), the recording of live scene 13 continues and processor 22 continues to generate video data as described above. Depending on the rates of video capture, video processing, etc., processor 22 generates data packet 28(II) as data packet 28(I) is transmitted to storage server 16. In turn, processor 22 transmits data packet 28(II) and generates video data for data packet 28(III), and so on until the recording of live scene 13 terminates and the final video data is processed and stored in data packet 28(N).

In some arrangements, when storage server 16 receives data packet 28(N), processor 32 generates an acknowledgement message 46 which it sends via network interface 36 to smartphone 14 over connection 11. In some further arrangements, acknowledgement message 46 includes a link to a website which includes a digital video player configured to play the recorded live scene derived from the video data stored in data packets 28(I), . . . , 28(N).

Figure 5:
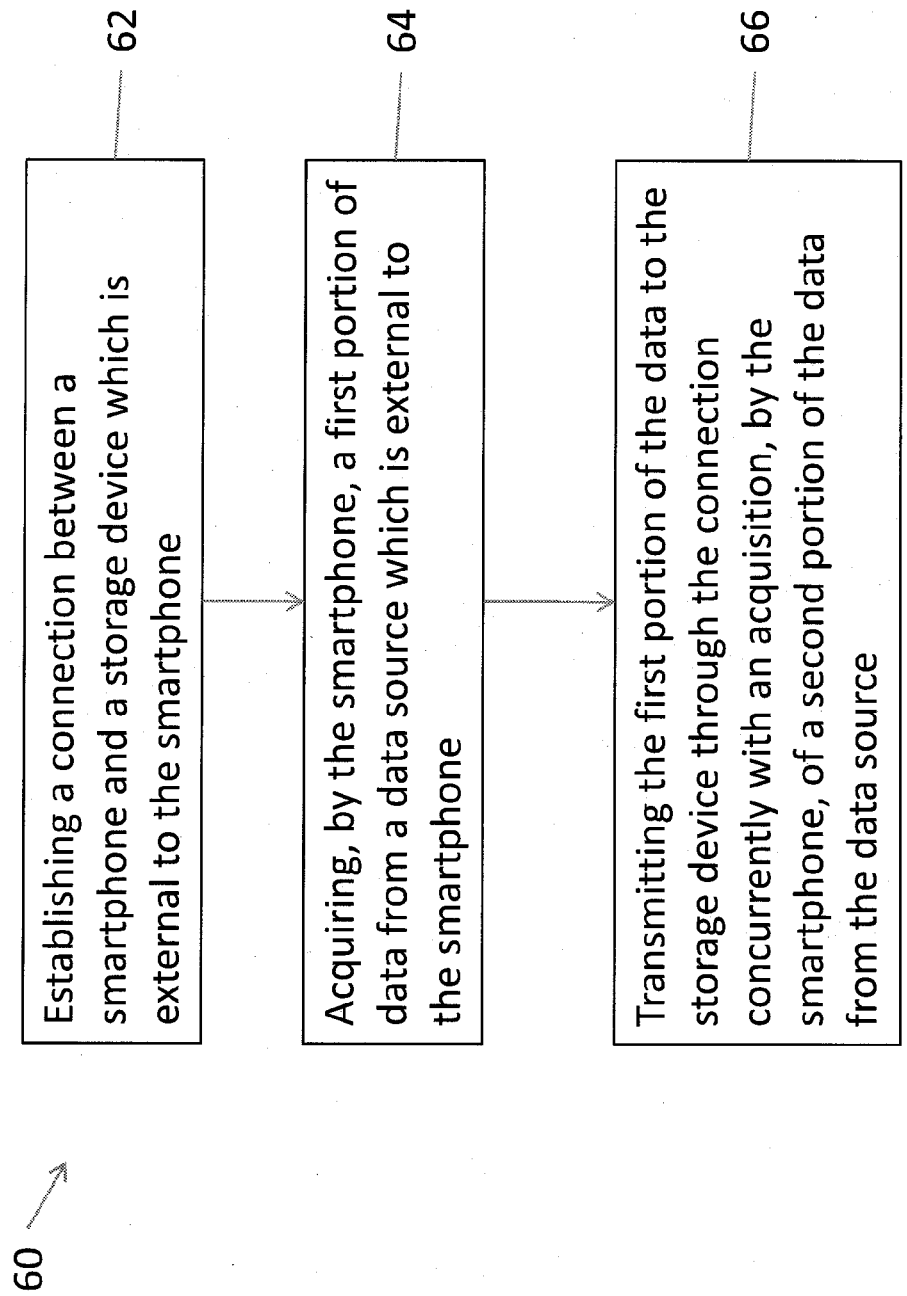
FIG. 5 is a flow chart illustrating a method for carrying out the improved technique within the electronic environment illustrated in FIG. 1.

FIG. 5 is a flow chart which illustrates a method 60 of storing data. In step 62, a connection is established between a smartphone and a storage device which is external to the smartphone. In step 64, a first portion of data is acquired from a data source which is external to the smartphone. In step 66, the first portion of the data is transmitted to the storage device through the connection concurrently with an acquisition, by the smartphone, of a second portion of the data from the data source.

While various embodiments of the invention have been particularly shown and described, it will be understood by those skilled in the art that various changes in form and details may be made therein without departing from the spirit and scope of the invention as defined by the appended claims.

For example, in some arrangements, smartphone 14 includes a microphone with which user 19 records sound from an external source. Processor 22 then generates sound data which is converted to binary data and compressed according to an MP3 compression standard and stored as audio frames in a payload 42 of a data packet 28. Audio and video frames can be stored together within the same data packet 28, with an audio frame corresponding to a video frame.

Furthermore, it should be understood that some embodiments are directed to smartphone 14 which stores files on a remote storage system. Some embodiments are directed to smartphone 14. Some embodiments are directed to a system which stores files on a remote storage system. Some embodiments are directed to a process of storing files on a remote storage system. Also, some embodiments are directed to a computer program product which enables computer logic to perform the storing of files on a remote storage system.

In some arrangements, smartphone 14 is implemented by a set of processors or other types of control/processing circuitry running software. In such arrangements, the software instructions can be delivered to smartphone 14 in the form of a computer program product (illustrated generally by code for computer program 80 stored within memory 24 in FIG. 2(a)) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of storing data, comprising:
establishing a connection between a smartphone and an external storage device which is external to the smartphone;
acquiring, by the smartphone, a first portion of data from a data source which is external to the smartphone; and
transmitting the first portion of the data to the external storage device through the connection concurrently with an acquisition, by the smartphone, of a second portion of the data from the data source;
wherein the smartphone includes a camera;
wherein the data source includes a live scene;
wherein acquiring the first portion of data includes:
recording the live scene with the camera; and
wherein the camera of the smartphone is integrated into the body of the smartphone, the camera and the smartphone forming a single, handheld unit that is constructed and arranged to be held up to the live scene by a user to allow the camera to capture an image of the live scene;
wherein recording the live scene with the camera includes:
forming, by the camera, images of the live scene within the smartphone;
wherein the smartphone further includes an internal storage device that is integrated into the body of the smartphone;
wherein establishing the connection between the smartphone and the external storage device includes:
allocating a predetermined amount of storage on the internal storage device for data associated with the recording of the live scene;
wherein transmitting the first portion of the data includes:
writing, in a header of the data packet, parameters which identify the first portion of the data;
wherein the data source further includes a geolocation of the live scene, the geolocation being recorded by a Global Positioning System (GPS) unit of the smartphone; and
wherein writing, in a header of the data packet, parameters which identify the first portion of the data further includes:
writing, in the header, a bit string representing the geolocation of the live scene.

2. A method according to claim 1, wherein transmitting the first portion of the data includes:
moving the first portion of the data into a payload of a data packet.

3. A method according to claim 2,
wherein recording the live scene with the camera includes:
representing the live scene as a set of video frames; and
converting the set of video frames to binary data; and
wherein writing, in a header of the data packet, parameters which identify the first portion of the data includes:
writing frame numbers in the header, the frame numbers identifying frames of the set of frames.

4. A method according to claim 3, wherein acquiring the first portion of the data further includes:
compressing video frames of the set of video frames according to an H.264 compression to form compressed video frames.

5. A method according to claim 4, wherein the smartphone further includes a microphone;
wherein the data source further includes sound associated with the live scene which is recorded with the microphone of the smartphone;
wherein acquiring the first portion of the data further includes:
recording the sound with the microphone, the recording of the sound being represented as a set of audio frames corresponding to the set of video frames; and
wherein moving the first portion of the data into a payload of a data packet includes:
compressing audio frames of the set of audio frames according to an MP3 compression.

6. A method according to claim 1, wherein establishing a connection includes:
sending a first signal to the external storage device over a wireless communication medium, the signal containing information regarding the storage of data from the data source; and
receiving a second signal from the external storage device which verifies a receipt of the first signal.

7. On an external storage device, a method of storing data, the method comprising:
sending a signal to a smartphone which is external to the external storage device, the signal verifying a connection between the smartphone and the external storage device;
receiving a first portion of data through the connection; and
storing the first portion of the data concurrently with receiving a second portion of the data through the connection;
wherein the first portion of the data and the second portion of the data are acquired by the smartphone from a data source external to the smartphone;
wherein the smartphone includes a camera;
wherein the data source includes a live scene;
wherein the signal includes instructions that cause the smartphone to record the live scene with the camera; and
wherein the camera of the smartphone is integrated into the body of the smartphone, the camera and the smartphone forming a single, handheld unit that is constructed and arranged to be held up to the live scene by a user to allow the camera to capture an image of the live scene; and
wherein the instructions that cause the smartphone to record the live scene with the camera include:
instructions that cause the smartphone to form, by the camera, images of the live scene within the smartphone;
wherein the smartphone further includes an internal storage device that is integrated into the body of the smartphone;
wherein the signal further includes instructions that cause the smartphone to:
allocate a predetermined amount of storage on the internal storage device for data associated with the recording of the live scene,
verify whether a storage of the second portion of the data to the internal storage device causes the amount of data associated with the recording of the live scene to exceed the predetermined amount of storage on the internal storage device,
when the storage of the second portion of the data to the internal storage device causes the amount of data associated with the recording of the live scene to exceed the predetermined amount of storage on the internal storage device, remove the first portion of the data from the internal storage device upon transmitting the first portion of the data to the external storage device, and
when the storage of the second portion of the data to the internal storage device does not cause the amount of data associated with the recording of the live scene to exceed the predetermined amount of storage on the internal storage device, keep the first portion of the data stored in the internal storage device;
wherein receiving the first portion of the data includes:
receiving, in a header of the data packet, parameters which identify the first portion of the data;
wherein the data source further includes a geolocation of the live scene, the geolocation being recorded by a Global Positioning System (GPS) unit of the smartphone; and
wherein receiving, in a header of the data packet, parameters which identify the first portion of the data further includes:
receiving, in the header, a bit string representing the geolocation of the live scene.

8. A system constructed and arranged to store data, the system comprising:
an external storage device; and
a smartphone which is external to the external storage device, the smartphone including:
a controller which includes controlling circuitry;
a network interface; and
data acquisition circuitry coupled to the controlling circuitry, the controlling circuitry constructed and arranged to:
establish a connection between a smartphone and the external storage device which is external to the smartphone,
acquire a first portion of data from a data source which is external to the smartphone, and
transmit the first portion of the data to the external storage device through the connection concurrently with an acquisition of a second portion of the data from the data source;
wherein the smartphone further includes a camera;
wherein the data source includes a live scene;
wherein acquiring the first portion of data includes:
recording the live scene with the camera; and
wherein the camera of the smartphone is integrated into the body of the smartphone, the camera and the smartphone forming a single, handheld unit that is constructed and arranged to be held up to the live scene by a user to allow the camera to capture an image of the live scene; and
wherein recording the live scene with the camera includes:
forming, by the camera, images of the live scene within the smartphone;

wherein the smartphone further includes an internal storage device that is integrated into the body of the smartphone;
wherein establishing the connection between the smartphone and the external storage device includes:
  allocating a predetermined amount of storage on the internal storage device for data associated with the recording of the live scene;
wherein transmitting the first portion of the data includes:
  writing, in a header of the data packet, parameters which identify the first portion of the data;
wherein the data source further includes a geolocation of the live scene, the geolocation being recorded by a Global Positioning System (GPS) unit of the smartphone; and
wherein writing, in a header of the data packet, parameters which identify the first portion of the data further includes:
  writing, in the header, a bit string representing the geolocation of the live scene.

9. A system according to claim 8, wherein transmitting the first portion of the data includes:
  moving the first portion of the data into a payload of a data packet.

10. A system according to claim 9,
  wherein recording the live scene with the camera includes:
    representing the live scene as a set of video frames; and
    converting the set of video frames to binary data; and
  wherein writing, in a header of the data packet, parameters which identify the first portion of the data includes:
    writing frame numbers in the header, the frame numbers identifying frames of the set of frames.

11. A system according to claim 10, wherein acquiring the first portion of the data further includes:
  compressing video frames of the set of video frames according to an H.264 compression to form compressed video frames.

12. A system according to claim 11, wherein the data acquisition circuitry further includes a microphone;
  wherein the data source further includes sound associated with the live scene which is recorded with the microphone;
  wherein acquiring the first portion of the data further includes:
    recording the sound with the microphone, the recording of the sound being represented as a set of audio frames corresponding to the set of video frames; and
  wherein moving the first portion of the data into a payload of a data packet includes:
    compressing audio frames of the set of audio frames according to an MP3 compression.

13. A computer program product having a non-transitory computer readable storage medium which stores a set of instructions to store data, the set of instructions, when carried out by a computerized device, causing the computerized device to:
  establish a connection between a smartphone and an external storage device which is external to the smartphone;
  acquire a first portion of data from a data source which is external to the smartphone; and
  transmit the first portion of the data to the external storage device through the connection concurrently with an acquisition of a second portion of the data from the data source;
  wherein the first portion of the data and the second portion of the data are acquired by the smartphone from a data source external to the smartphone;
  wherein the smartphone includes a camera;
  wherein the data source includes a live scene;
  wherein acquiring the first portion of data includes:
    recording the live scene with the camera; and
  wherein the camera of the smartphone is integrated into the body of the smartphone, the camera and the smartphone forming a single, handheld unit that is constructed and arranged to be held up to the live scene by a user to allow the camera to capture an image of the live scene; and
  wherein recording the live scene with the camera includes:
    forming, by the camera, images of the live scene within the smartphone;
  wherein the smartphone further includes an internal storage device that is integrated into the body of the smartphone;
  wherein establishing the connection between the smartphone and the external storage device includes:
    allocating a predetermined amount of storage on the internal storage device for data associated with the recording of the live scene;
  wherein transmitting the first portion of the data includes:
    writing, in a header of the data packet, parameters which identify the first portion of the data;
  wherein the data source further includes a geolocation of the live scene, the geolocation being recorded by a Global Positioning System (GPS) unit of the smartphone; and
  wherein writing, in a header of the data packet, parameters which identify the first portion of the data further includes:
    writing, in the header, a bit string representing the geolocation of the live scene.

14. A computer program product according to claim 13, wherein transmitting the first portion of the data includes:
  moving the first portion of the data into a payload of a data packet.

15. A computer program product according to claim 14,
  wherein recording the live scene with the camera includes:
    representing the live scene as a set of video frames; and
    converting the set of video frames to binary data; and
  wherein writing, in a header of the data packet, parameters which identify the first portion of the data includes:
    writing frame numbers in the header, the frame numbers identifying frames of the set of frames.

16. A computer program product according to claim 15, wherein acquiring the first portion of the data further includes:
  compressing video frames of the set of video frames according to an H.264 compression to form compressed video frames.

17. A computer program product according to claim 16, wherein the smartphone further includes a microphone;
  wherein the data source further includes sound associated with the live scene which is recorded with the microphone of the smartphone;
  wherein acquiring the first portion of the data further includes:
    recording the sound with the microphone, the recording of the sound being represented as a set of audio frames corresponding to the set of video frames; and
  wherein moving the first portion of the data into a payload of a data packet includes:
    compressing audio frames of the set of audio frames according to an MP3 compression.

18. A method according to claim 1,
  wherein the method further comprises:

providing a message to the external storage drive that recording of the live scene has terminated; and obtaining a link to a website which includes a digital video player configured to play a recording of the live scene as recorded with the camera.

19. A method according to claim 1, wherein transmitting the first portion of the data includes:
moving the first portion of the data into a payload of a data packet, and writing, in a header of the data packet, parameters which identify the first portion of the data;

wherein the method further comprises:
receiving a predetermined size value indicative of the amount of data to be stored in the payload of the data packet as the first portion of the data, and providing the predetermined size value in the header of the data packet.

20. A method according to claim 1, wherein the smartphone further includes a digital display, the digital display being integrated into the body of the smartphone, the digital display being part of the single, handheld unit, the digital display being constructed and arranged to allow the user to view the image of the live scene formed within the camera; and wherein forming images of the live scene within the smartphone includes:
sending digital representations of the images of the live scene to the digital display.

21. A method according to claim 1, wherein transmitting the first portion of the data to the external storage device through the connection concurrently with the acquisition of the second portion of the data includes:
verifying whether a storage of the second portion of the data to the internal storage device causes the amount of data associated with the recording of the live scene to exceed the predetermined amount of storage on the internal storage device, when the storage of the second portion of the data to the internal storage device causes the amount of data associated with the recording of the live scene to exceed the predetermined amount of storage on the internal storage device, removing the first portion of the data from the internal storage device upon transmitting the first portion of the data to the external storage device, and when the storage of the second portion of the data to the internal storage device does not cause the amount of data associated with the recording of the live scene to exceed the predetermined amount of storage on the internal storage device, keeping the first portion of the data stored in the internal storage device.

* * * * *